United States Patent
Raichart

(10) Patent No.: US 10,792,830 B2
(45) Date of Patent: Oct. 6, 2020

(54) APPARATUS AND RELATED METHODS FOR TRIMMING DRIED CANNABIS FLOWERS

(71) Applicant: GREENBROZ, INC., La Jolla, CA (US)

(72) Inventor: Cullen Raichart, San Diego, CA (US)

(*) Notice: Subject to any disclaimer, the term of this patent is extended or adjusted under 35 U.S.C. 154(b) by 0 days.

(21) Appl. No.: 15/861,454

(22) Filed: Jan. 3, 2018

(65) Prior Publication Data

US 2018/0126578 A1    May 10, 2018

Related U.S. Application Data

(60) Continuation of application No. 15/586,206, filed on May 3, 2017, which is a division of application No. 14/455,804, filed on Aug. 8, 2014.

(51) Int. Cl.
| | | |
|---|---|---|
| *B26D 1/29* | (2006.01) | |
| *A01G 5/00* | (2006.01) | |
| *B26D 1/147* | (2006.01) | |
| *A23N 15/06* | (2006.01) | |
| *A23N 15/04* | (2006.01) | |
| *A01G 22/00* | (2018.01) | |
| *B26D 1/00* | (2006.01) | |

(52) U.S. Cl.
CPC ............... *B26D 1/29* (2013.01); *A01G 5/00* (2013.01); *A01G 22/00* (2018.02); *A23N 15/04* (2013.01); *A23N 15/06* (2013.01); *B26D 1/0006* (2013.01); *B26D 1/147* (2013.01); *B26D 2001/0066* (2013.01)

(58) Field of Classification Search
CPC ........ B26D 1/29; B26D 1/0006; B26D 1/147; B26D 2001/0066; A01G 22/00; A01G 1/001; A01G 5/00
See application file for complete search history.

(56) References Cited

U.S. PATENT DOCUMENTS

| | | | |
|---|---|---|---|
| 2,592,833 | A | 4/1952 | Swanson |
| D755,263 | S * | 5/2016 | Raichart ................. D15/126 |
| D795,316 | S * | 8/2017 | Raichart ................. D15/127 |
| D807,131 | S * | 1/2018 | Laeger ....................... D8/7 |
| 10,631,467 | B1 * | 4/2020 | Burnett ................ A01G 3/002 |
| 2007/0006905 | A1 | 3/2007 | Shouse et al. |
| 2014/0196587 | A1 | 7/2014 | Beyerlein et al. |
| 2014/0209718 | A1 | 7/2014 | Bevins |

(Continued)

FOREIGN PATENT DOCUMENTS

WO    WO2016023044 A1    2/2016

OTHER PUBLICATIONS

Monster Gardens Dot Com. Green Bros Automatic Dry Flower Bud Trimmer for Dry Product—Trim Dry Machine Green. You Tube. Jul. 21, 2014. [ Retrieved on 2015-Oct. 2007] retrieved from Internet <https://www.youtube.com/watch?v=apfywuHGZbu>.

*Primary Examiner* — Jonathan G Riley

(74) *Attorney, Agent, or Firm* — Buche & Associates, P.C.; John K. Buche; Bryce A. Johnson

(57) ABSTRACT

In a preferred embodiment, the apparatus comprises: (1) a box with specifically designed blades for cutting; (2) a motor for rotating the blades over each other; (3) a sweeper mechanism to gently move the flowers around the enclosure blade; and, (4) a brush mechanism to gently tumble flowers over the blade surface.

14 Claims, 6 Drawing Sheets

(56) References Cited

U.S. PATENT DOCUMENTS

2014/0331837 A1* 11/2014 Holcomb ................ B26D 1/38
                                                                                                     83/104
2015/0047485 A1* 2/2015 Schroeder .............. A23N 15/06
                                                                                                     83/104

* cited by examiner

US 10,792,830 B2

APPARATUS AND RELATED METHODS FOR TRIMMING DRIED CANNABIS FLOWERS

CROSS-REFERENCE TO RELATED APPLICATIONS

This document is a continuation of U.S. application Ser. No. 15/586,206 (filed May 3, 2017). U.S. application Ser. No. 15/586,206 is a division of U.S. application Ser. No. 14/455,804 (filed Aug. 8, 2014) now abandoned. The above referenced documents are hereby incorporated by reference in their entirety.

STATEMENT REGARDING FEDERALLY SPONSORED RESEARCH OR DEVELOPMENT

Not applicable

BACKGROUND OF INVENTION

Field of Invention

This specification describes subject matter in the field of apparatus and related methods of trimming dried plants, including but not limited to *cannabis*.

Background of Invention

*Cannabis* flowers or buds are harvested, dried and cured to be used by people for various purposes including medicinal uses. The *cannabis* flower contains the highest volume of psychoactive compounds in the *cannabis* plant. Also, the plant buds may contain non-intoxicating CBD compounds that are of pharmaceutical and medical interest. Cannabidiol (CBD) is one of at least 60 active cannabinoids identified in *cannabis*. It is a major constituent of the plant, accounting for up to 40% of the plant's extract, as a non-psychotropic phytocannabinoid. CBD is considered by some to have a wider scope of medical applications than tetrahydrocannabinol (THC). In contrast, *cannabis* leaves contain only trace amounts of psychoactive and other compounds, and usually will go to compost. *Cannabis* flowers have traditionally been hand trimmed to remove the unwanted leafy matter, leaving only the flowers. Typically, hand trimming is done by cutting the leaves off with scissors. The hand trimming of *cannabis* flowers is time consuming and tedious. Additionally, hand trimming requires skilled labor. Typically, it takes a skilled trimmer about eight to ten hours to trim one pound of *cannabis*. Trimming at this speed may be feasible for small scale growers, but for larger growers, hand trimming is impractical and can become expensive if the grower must hire outside help.

One solution to hand trimming has been use of machines that automatically trim the plants. These machines can typically trim the same amount of *cannabis* in one hour that an individual worker can trim in one day. Existing automated methods are designed to trim the flowers while they are freshly harvested or "wet." Wet trimming involves violent action that damages the buds and removes resin glands. The wet trimming action reduces the quality of the end by reducing potency and not allowing proper drying and curing. Furthermore, when buds are trimmed wet, the residue from the buds can leave a sticky mess on a trimmer, necessitating constant cleaning of a trimmer machine. Trimming the *cannabis* flower when wet reduces potency, appearance and quality.

The alternative to trimming freshly harvested buds is to trim buds that have been dried. Trimming dry buds produces a better smell and flavor. Drying and curing of the *cannabis* flower is essential to the value and quality of the end product. Trimming of dry *cannabis* requires a gentle action that does not damage the product. Most trimmers utilize blades that rotate at a high speed. This high speed rotation is not suitable for trimming dried *cannabis* plants. Currently no reliable apparatus of automated trimming of dry *cannabis* is known.

In light of the foregoing, a need exists for a device that automates the trimming of dried *cannabis* in such a way that it is not damaged in appearance, potency or overall quality.

SUMMARY OF THE INVENTION

With the aforementioned in mind, it is an object of this description to disclose a device that trims dried *cannabis* flowers in a gentle yet effective manner. It is further an objective to disclose apparatus and related methods of trimming *cannabis* flowers without the drawbacks of heretofore known apparatus. Yet still, it is an objective to disclose apparatus and related methods of trimming dried *cannabis* flowers so that a higher quality *cannabis* flower can be used for recreational or medicinal purposes. In a preferred embodiment, the apparatus comprises: (1) a box with specifically designed blades for cutting; (2) a motor for rotating the blades over each other; (3) a sweeper mechanism to gently move the flowers around the enclosure blade; and, (4) a brush mechanism to gently tumble flowers over the blade surface.

In one mode of operation, dried *cannabis* buds may be put into a box. The motor is then turned on to provide rotation to the blades and a sweeper bar. The rotating of blades creates a scissor action that cuts off the extruding leaves from the buds, while the sweeper bar stirs the flowers so that all sides of the buds are exposed to the scissoring action. The scraper bar then further agitates the bud by removing them from the blade and causing them to tumble. Once trimmed, the buds may be extracted through the extraction port in the side of the box and more buds may then be added to repeat the cycle.

BRIEF DESCRIPTION OF THE FIGURES

The manner in which these objectives and other desirable characteristics can be obtained is explained in the following description and attached figures in which.

DETAILED DESCRIPTION OF THE INVENTION

Figure 1:
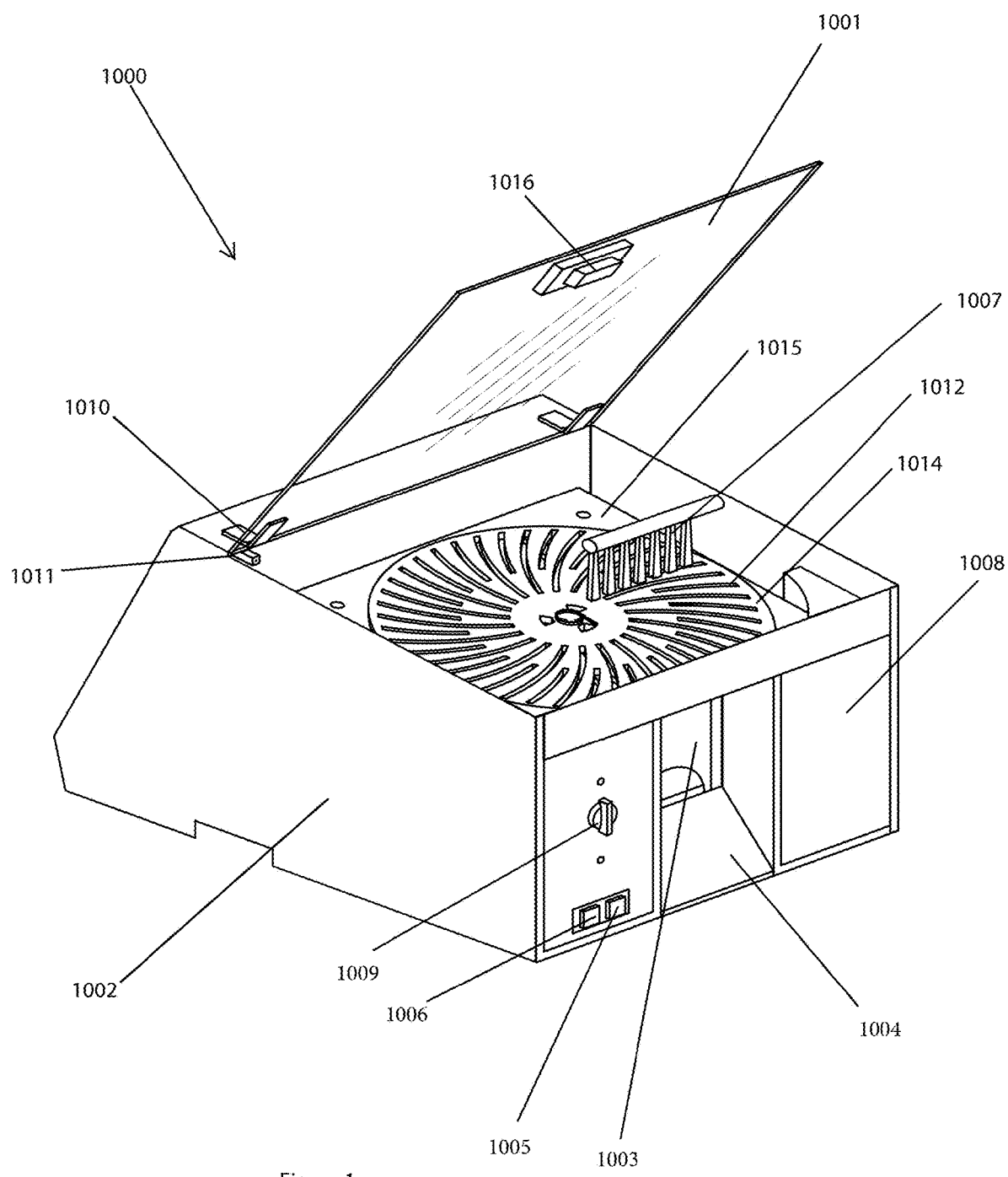
FIG. 1 is perspective view of the trimmer.

FIG. 1 is a perspective view of preferred embodiment of the trimmer 1000. The trimmer 1000 preferably comprises a box 1002, two blades 1014, 1015 and a sweeper 1007. Both of the blades 1014, 1015 have a pattern of arced openings 1012 (see FIG. 3, 1013). The blades 1014, 1015 are preferably constructed from stainless steel, but can be made from other kinds of metal or alloys. The sweeper 1007 is located above the top blade 1014. The sweeper 1007 gently pushes the plants around and can tumble the plants to ensure that all sides of the plant are cut. In the preferred embodiment, the height of the sweeper 1007 is adjustable so that a user can move the sweeper 1007 up, down or out of the way depending on the size of the plants to be trimmed. It should also be noted that the trimmer is situated so that the blades are on a downward sloping angle. It has been found that this facilitates a cutting and separating action.

Still referring to FIG. 1, the blades are housed inside of a box 1002. At the top of the box is a lid 1001. The lid 1001 opens and closes via a hinge 1010 and the lid 1001 can be secured in place via a latch 1016. Suitably, the lid 1001 features a sensor 1011. The sensor 1011 is a safety mechanism that will shut off the machine when the lid 1001 is open. In the preferred embodiment, the lid 1001 is transparent. The lid 1001 is preferably made from a clear Plexiglas®, but may be made of glass or another transparent material. A transparent lid 1001 is preferable because it allows the user to see the trimmer 1000 cut the plant and visually assess the process. The box 1002 is preferably made of metal, but may also be made of a sturdy polymer capable of withstanding high temperatures.

As shown in FIG. 1, the front of the trimmer 1000 consists of two panels 1008, a door 1003 in the center and a hatch 1004 for permitting access to the cut plants. On the left panel 1008, there are several controls for the trimmer 1000. On the top of the left panel 1008, there is a dial 1009 that controls the speed of the top blade 1014. On the bottom of the left side panel 1008 there are two switches: a light switch 1005 which controls a light (not shown) and the motor switch 1006 which turns the trimmer 1000 on and off.

Figure 2:
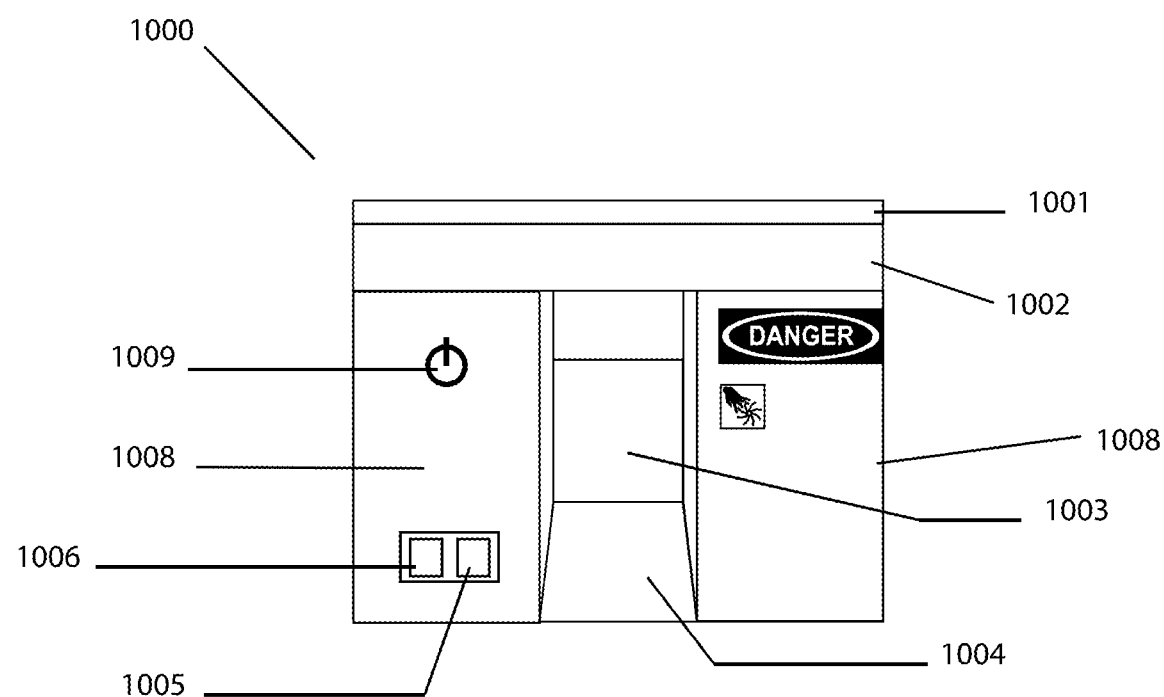
FIG. 2 is a front view of the trimmer.

FIG. 2 depicts a front view of the trimmer 1000 and shows a more detailed view of the instrument panel that controls the trimmer 1000. As shown, there are two switches 1005, 1006 and a control dial 1009 that control the speed of the motor (see FIG. 4, 1017). In the embodiment shown, the control dial 1009 has three speed settings, but alternate embodiments may have more or fewer settings. In the preferred embodiment of the trimmer 1000, the motor runs at a speed slower than other typical trimmers. One reason for operating at a slower speed is that the trimmer 1000 can trim dry plants without damaging the buds.

Figure 3:
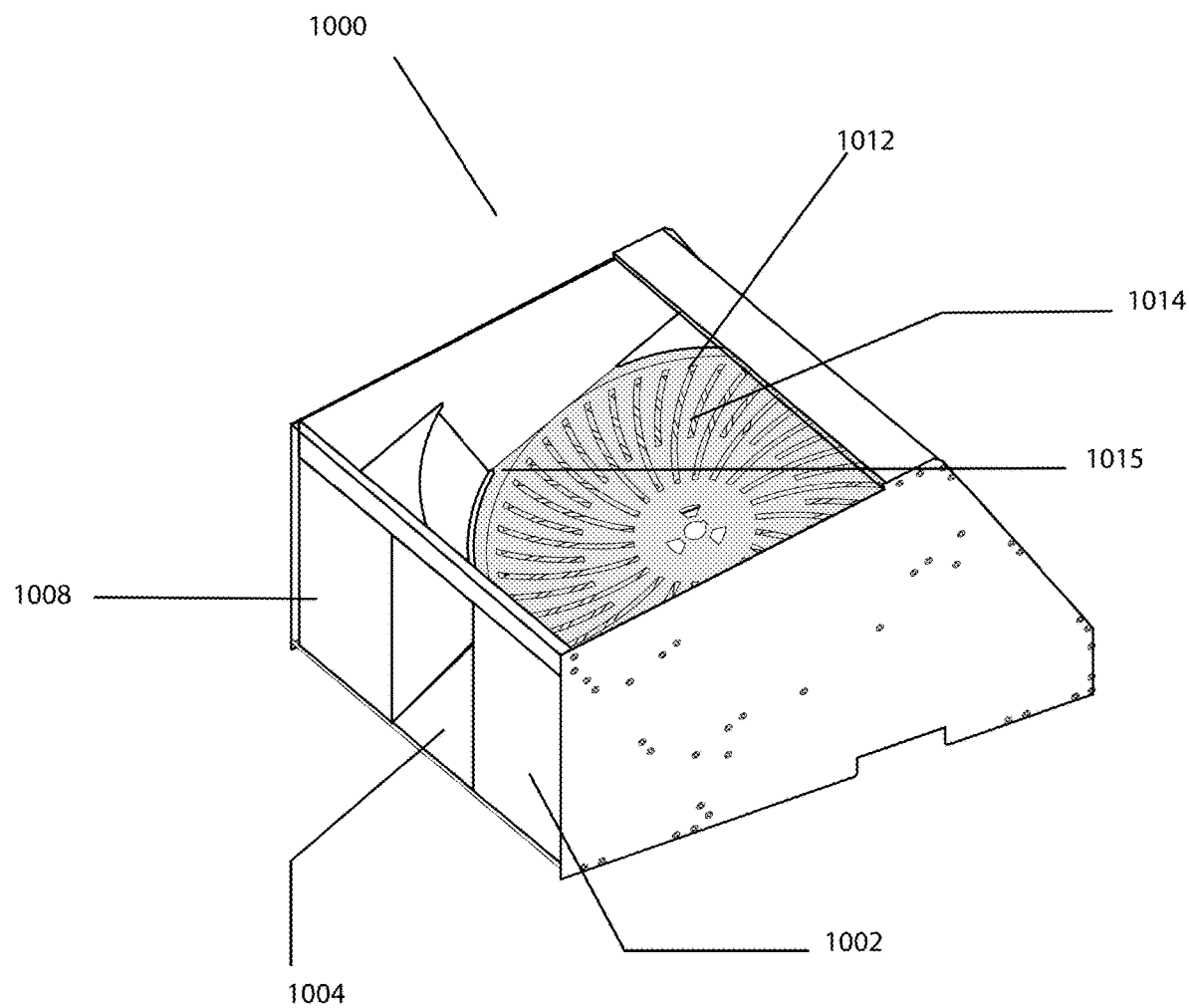
FIG. 3 is a perspective view of the trimmer with top exposed.

FIG. 3 shows a perspective view of the trimmer 1000 without the lid 1001. On the inside of the trimmer 1000 are two blades—a circular top blade 1014 and a bottom blade 1015. Preferably, the arced openings 1012, 1013 on the blades 1014, 1015 are narrow so only the smaller extrusions (i.e. leaves) from the *cannabis* plant are trimmed, while the larger parts or the plant (i.e. the flowers) remain intact. Both blades 1014, 1015 have arced openings 1012, 1013 to cut the *cannabis* plant. The arced openings 1012 on the top blade 1014 are in the opposite direction of the arced openings 1013 on the bottom blade 1015. The arced openings in 1012, 1013 are preferably in opposite directions to one another as shown in FIG. 3. The openings 1012, 1013 may be sharpened to facilitate trimming of the leaves of the plant, but the openings 1012, 1013 are less sharp than wet trimmers in order to trim the extrusions without damaging the larger plant. The top blade 1014 is circular and rotatably connected to a motor 1017 and the bottom blade 1015 is square and fixedly fastened to the trimmer 1000. It would be possible to configure the apparatus to that the either the top or the bottom could turn, but this embodiment has the turning action on the top blade 1014.

Figure 4:
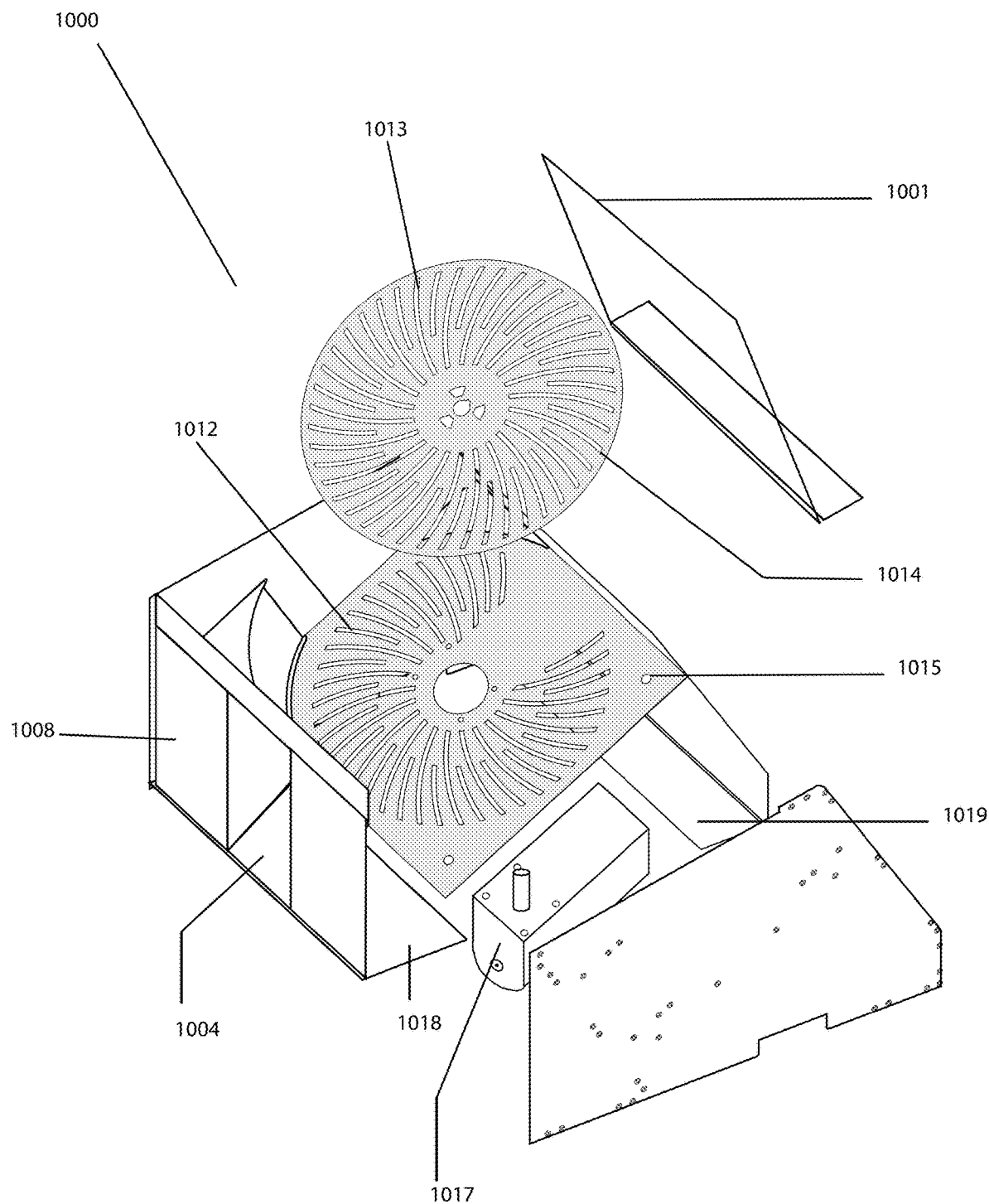
FIG. 4 is an exploded view that shows the components of the trimmer.

FIG. 4 shows an exploded view of the trimmer 1000. This view depicts the blades 1014, 1015 more clearly. FIG. 4 also shows how the blades 1014, 1015 are configured to interact with one another in the preferred embodiment. In the preferred embodiment, the blades 1014, 1015 are at a 30 degree angle with respect to the box 1002. The 30 degree angle is preferable for cutting the plants because this angle allows for the plants to rotate in a gentle motion, although other downward angles may be suitable so that gravity will assist the cutting process. The 30 degree angle is also preferable because when the trimmer is finished, the product falls down toward the door 1003.

The motor is controlled by the motor switch 1006 and is connected directly to the top blade 1014. When the motor switch 1006 is turned on, the motor 1017 rotates the top blade 1014, while the bottom blade remains stationary. The rotation produces a scissor-like effect between the top blade 1014 and bottom blade 1015. The arced openings 1012, 1013 are narrow, so that the dried leaves that protrude from the buds will fit through the arced openings 1012, 1013. The scissor-like effect will cut the leaves buds. The bottom blade 1015 does not have openings at the top center so that clippings do not fall through onto the motor. Dried clippings falling onto the motor can be troublesome to clean up and presents a fire hazard.

FIG. 4 also depicts two bottom panels 1018, 1019. In the preferred embodiment, the bottom panels 1018, 1019 do not fully cover the bottom of the box 1002, leaving an opening beneath the trimmer 1000. This allows a user to place the trimmer 1000 on top of a bin or bag in order to collect the cut leaves.

Figure 5:
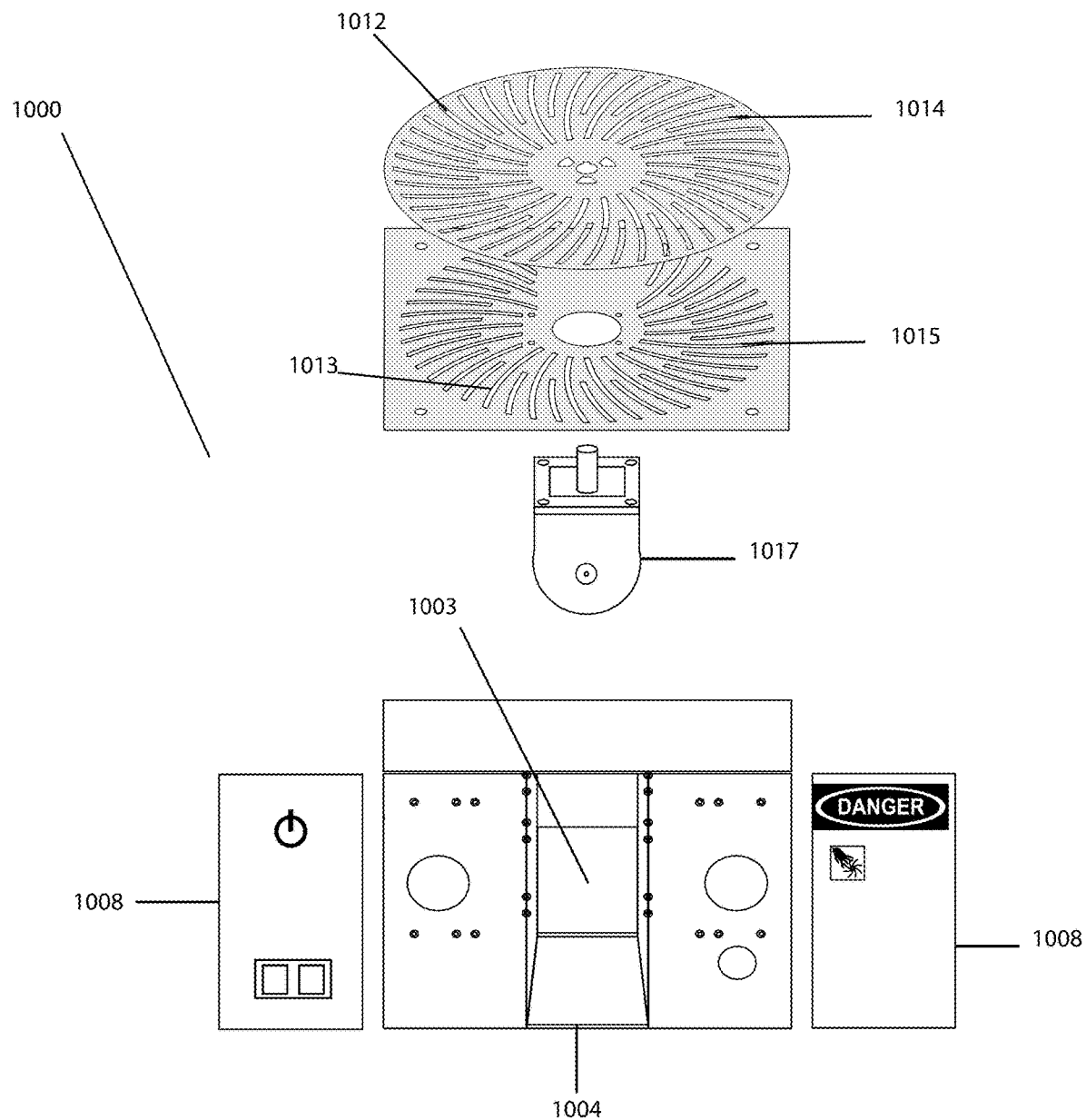
FIG. 5 is an exploded view that shows the components of the trimmer along with the instrument panel.

FIG. 5 depicts an exploded view of the trimmer 1000 and shows the front panels 1008, the motor 1017, the hatch 1004, the door 1003, and the blades 1014, 1015. FIG. 5 shows how the pattern of the arced openings 1012, 1013 of the blades 1014, 1015 are complimentary to each other, and how the arcs are preferably oriented in opposite directions to one another.

Figure 6:
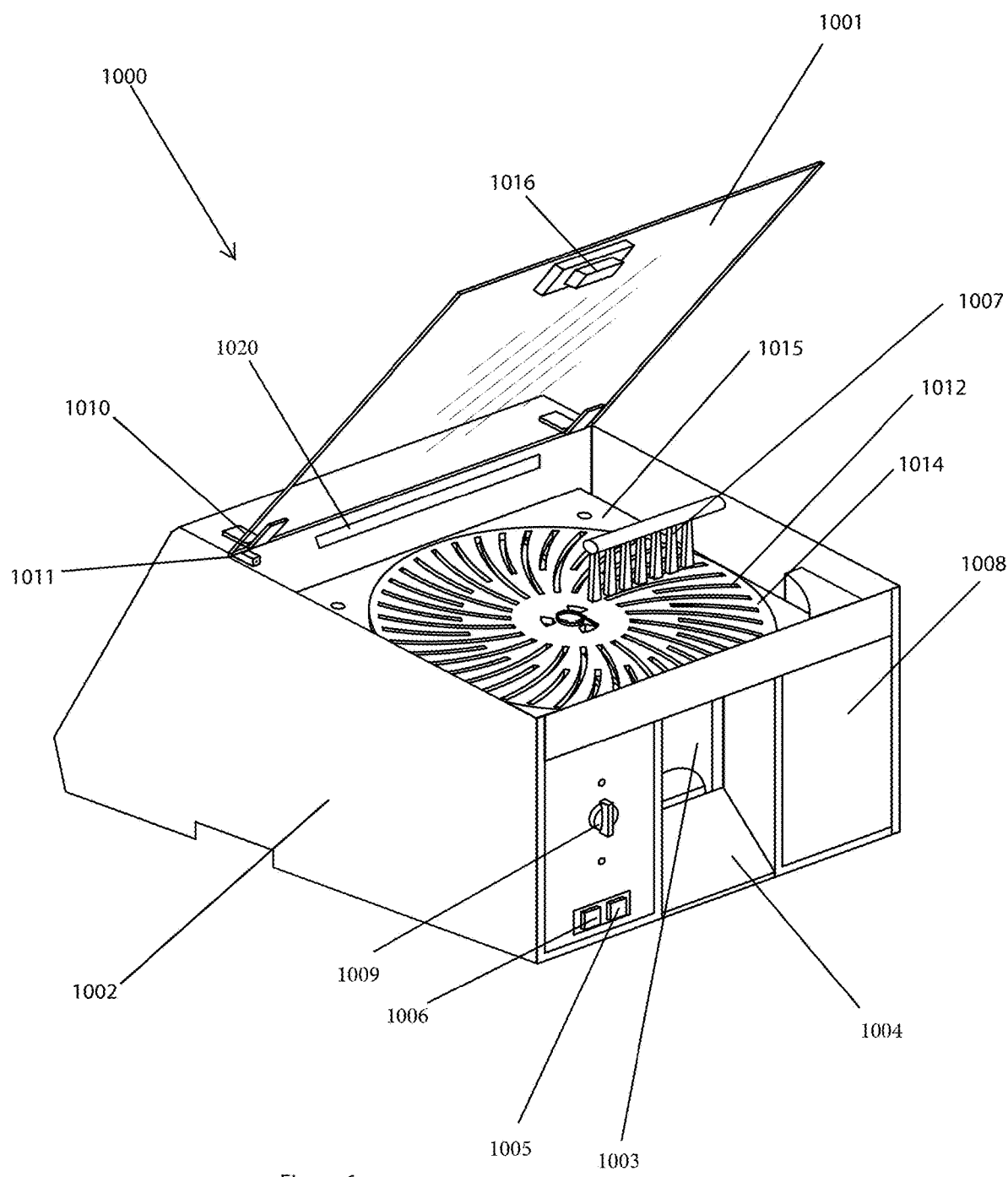
FIG. 6 is a perspective view of an alternate embodiment of the trimmer.

FIG. 6 shows an alternate embodiment of the trimmer 1000. This embodiment features a germicidal lamp 1020. The germicidal lamp is a UV producing light that will kill harmful bacteria that may be found on the buds.

To operate the trimmer 1000, a user lifts the lid 1001 and places the product on top of the top blade 1015. The user may adjust the sweeper 1007, if the user desires. The user then closes the lid 1001 and uses the switch 1006 to turn on the motor 1017. The motor 1017 rotates the top blade 1015, gently trimming the extrusions of the plant. The sweeper 1007 pushes the plant around, so that all sides of the plant are trimmed. When the plant is trimmed, the user turns off the motor 1017, and can retrieve the finished product by opening the door 1003 and allowing the product to fall through the hatch 1004.

While various embodiments of the method and apparatus have been described above, it should be understood that they have been presented by way of example only, and not of limitation. Likewise, the various diagrams might depict an example of an architectural or other configuration for the disclosed method and apparatus, which is done to aid in understanding the features and functionality that might be included in the method and apparatus. The disclosed method and apparatus is not restricted to the illustrated example architectures or configurations, but the desired features might be implemented using a variety of alternative architectures and configurations. Indeed, it will be apparent to one of skill in the art how alternative functional, logical or physical partitioning and configurations might be implemented to implement the desired features of the disclosed method and apparatus. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "module" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration. All of the claims as originally filed are hereby incorporated into this specification by reference.

The invention claimed is:

1. An apparatus (1000) for trimming dried plants comprising:
   a housing (1002) defined by
      a back side with horizontal bottom panel (1019),
      a top panel that is connected to a lid (1001) via a hinge (1010),
      a left side,
      a right side,
      a front side with a horizontal bottom panel (1018), wherein the front side is further defined by two panels (1008), a hatch (1004), and a door (1003) that is located between the two panels (1008) and that selectively closes the hatch (1004),
      a square and stationary floor (1015) that tapers downward from a top portion of back side to a top side of the hatch (1004), said floor (1015) featuring a first plurality of openings (1012) disposed through the floor (1015) in a C-shaped pattern, wherein each opening within said first plurality of openings (1012) is defined by at least one cutting edge,
      an internal corner member with a surface that (a) extends toward the lid in a direction that is normal relative to the floor (1015) and (b) arcs from a midpoint of said left side toward a left side of said door (1003);
   a rotatable disk (1014) situated over the floor with a second plurality of openings that are disposed through the disk (1014) in an annular pattern wherein each opening (1013) within said first plurality of openings is defined by at least one cutting edge, wherein said annular pattern is superimposed on said C-shaped pattern and wherein rotating the rotatable disk relative to the floor accomplishes a cutting action between the first and second plurality of openings;
   a motor (1017) that is mechanically coupled to the rotatable disk (1014) via a drive shaft provided through the floor (1015) so that the motor is not directly under any of the first plurality of openings and so that operating the motor (1017) rotates the rotatable disk (1014) relative to the floor (1015).

2. The apparatus (1000) of claim 1 where an axis of rotation of the rotatable disk (1014) when rotated by the motor (1017) is at an angle oblique to a horizontal plane.

3. The apparatus (1000) of claim 2 where said oblique angle is approximately thirty degrees.

4. The apparatus (1000) of claim 1 where the floor of the housing defines a plane that is oriented at an angle that is oblique to a horizontal plane.

5. The apparatus (1000) of claim 4 where said oblique angle is approximately thirty degrees.

6. The apparatus (1000) of claim 1 where trimmed plants are removed removable through a door (1004).

7. A method of trimming dried plants comprising:
   locating housing that has a square stationary floor featuring a C-shaped pattern of openings including an opening defined by at least one cutting edge;
   locating a rotatable disk over the floor, where the rotatable disk features an annular pattern of openings with at least one opening that also has a cutting edge, wherein the annular pattern is superimposed on the C-shaped pattern and wherein rotating the rotatable disk relative to the floor accomplishes a cutting action between the at least one cutting edge of the floor and the at least one cutting edge of the rotatable disk;
   locating a motor under the floor so that it is not directly beneath any one of the openings of the C-shaped pattern of openings;

placing dried plants on top of the rotatable disk within the housing; and, operating the motor with a drive shaft provided through the floor so that the plants are trimmed by the cutting action between the at least one cutting edge of the floor and the at least one cutting edge of the rotatable disk.

8. The method of claim 7 where an axis of rotation of the rotatable disk when rotated by the motor is at an angle that is oblique to a horizontal plane.

9. The method of claim 8 where said oblique angle is about thirty degrees.

10. The method of claim 9 further comprising the step of moving the plants along the rotatable disk after being trimmed, where said movement is assisted by the force of gravity.

11. The method of claim 7 further comprising the step of orienting the floor of the housing so that said floor defines a plane that is oriented at an angle that is oblique to a horizontal plane.

12. The method of claim 10 further comprising the step of removing the plants through a door in a sidewall of the housing after said movement along the rotatable disk.

13. The method of claim 12 further comprising the step of passing plant clippings through the opening in the floor.

14. A method of manufacturing an apparatus for trimming dried plants comprising the steps of:

constructing a housing that has a floor wherein the floor has a first plurality of openings provided through the floor in a C-shaped pattern;

establishing a first cutting edge in one of the plurality of openings established in the floor;

constructing a rotatable disk that has at least one opening disposed in a circular pattern, wherein the at least one opening of the disk has a cutting edge;

installing the rotatable disk over the floor within the housing so that the circular pattern is superimposed on the C-shaped pattern and so that rotating the rotatable surface relative to the floor results in a cutting action; and, installing a motor under the floor beneath the C-shaped pattern, said motor with a drive shaft through the floor so that operation of the motor results in the rotatable disk situated above the floor rotating relative to the floor.

\* \* \* \* \*